(12) United States Patent
Speltacker et al.

(10) Patent No.: US 7,496,066 B2
(45) Date of Patent: Feb. 24, 2009

(54) MANAGING MOBILITY OF WIRELESS DEVICES IN DISTRIBUTED COMMUNICATION NETWORKS

(75) Inventors: Wilfried Speltacker, Eckental (DE); Mirko Schacht, Allersberg (DE); Markus Georg Bauer, Pegnitz (DE)

(73) Assignee: Lucent Technologies Inc., Murray Hill, NJ (US)

( * ) Notice: Subject to any disclaimer, the term of this patent is extended or adjusted under 35 U.S.C. 154(b) by 514 days.

(21) Appl. No.: 11/022,328

(22) Filed: Dec. 23, 2004

(65) Prior Publication Data
US 2006/0140143 A1 Jun. 29, 2006

(51) Int. Cl.
*H04Q 7/00* (2006.01)
(52) U.S. Cl. .................... 370/328; 370/349; 455/426.1; 455/560; 455/432.1; 455/432.3
(58) Field of Classification Search ................. 380/349; 455/426.1, 560, 432.1, 432.3
See application file for complete search history.

(56) References Cited
U.S. PATENT DOCUMENTS

2004/0176135 A1 * 9/2004 Palkisto ................... 455/560

2004/0203736 A1 * 10/2004 Serna ..................... 455/426.1

OTHER PUBLICATIONS

"Evolution of the Utran Architecture", by Markus Bauer, Peter Schefczik, Michael Soellner, Wilfried Speltacker, of Lucent Technologies, Germany.
European Search Report Application No. EP 04 25 8100 dated Jun. 30, 2005.

* cited by examiner

*Primary Examiner*—David Q. Nguyen

(57) ABSTRACT

The present invention provides a method and an apparatus for managing mobility of a wireless communication device across a first and a second access node in a common administrational area of a network. The method comprises using the first access node to assign a temporary identification to the wireless communication device, causing the second access node to identify the first access node from which the temporary identification originates and hiding the mobility of the wireless communication device from the network when routing traffic to a serving access node of the first and second access nodes based on the identified first access node and the temporary identification. In one embodiment, use of software at these access nodes may enable deploying of a centralized logical functionality instead of centralized physical nodes. This software may provide mobility management of one or more wireless communication devices across a group of radio access nodes including base stations or Node Bs in a multi-vendor environment and a non-supplier specific. Through such decentralization, for example, network vendors may provide mobility management with insignificant impact on existing standards and interchangeability of network elements of a network, such as an Internet protocol (IP) network.

10 Claims, 9 Drawing Sheets

MANAGING MOBILITY OF WIRELESS DEVICES IN DISTRIBUTED COMMUNICATION NETWORKS

BACKGROUND OF THE INVENTION

1. Field of the Invention

This invention relates generally to telecommunications, and more particularly, to wireless communications.

2. Description of the Related Art

The rise of Internet has resulted in a trend that demands more and more services, such as Internet protocol (IP)-based services by mobile users. However, a universal mobile telecommunication system (UMTS) terrestrial radio access network (UTRAN) is unable to satisfy this demand efficiently because UTRAN has inherited a centralized network architecture with a quite complex central radio network controller (RNC) and simple base stations (e.g., a base transceiver station (BTS) called "Node B" in UMTS) from global system for mobile communications (GSM)—a land mobile pan-European digital cellular radio communications system. Therefore, to cope efficiently with an expected growth of data communication and to exploit the full scope of IP applications, some further modifications to the centralized network architecture for the UMTS radio access network, as defined in Rel.5, may be needed.

However, the centralized network architecture offers such features which are not that useful in an IP network architecture. For example, the centralized network architecture is strictly hierarchical. The centralized network architecture contains a core network (CN), represented by serving global packet radio service (GPRS) support node (SGSN) that performs mobility and data session management for GPRS mobiles is the highest level, followed by a RNC, which distributes the traffic to the respective Node B. In the centralized network architecture, the main intelligence of the UTRAN is concentrated within the RNC.

As a central instance, a RNC manages the provisioning of all necessary bearer services for control and user traffic in order to establish a radio access bearer (RAB) between user equipment (UE) and a CN. This centralized network architecture for GSM provides wireless access to a circuit-switched (CS); voice-oriented telecommunications network, such as a public switched telecommunications network (PSTN). Thus, the transport network topology of the centralized network architecture pursues this hierarchy and is a star or a tree shaped. Instead, the IP network architecture is logically fully meshed and hides its physical topology from the transport mechanism itself.

Although the centralized network architecture has been since extended to packet data services, such as GPRS, but the rise of the Internet and its different service requirements have not been addressed adequately. Even if IP transport may replace Asynchronous Transfer Mode (ATM)-based links between a RNC and a Node B, a full advantage of the IP transport may not be realized because of characteristics of various interfaces that involve carrying synchronized radio link blocks with a high quality of service, regardless of a user service to which they belong.

Specifically, to manage mobility of several users within a given group of access nodes (e.g. micro-mobility within a location or a routing area), in the centralized network architecture, a central node keeps track of any user or UE, such as a wireless communication device within its administrational area. In order to allow a quick locating of a specific UE, the name (i.e. node identification (ID)) of this central node is reported to a home location register (HLR) of the UE; regardless if the UE is in its home public land mobile network (H-PLMN) or visited PLMN (V-PLMN). If the administrational area is small, for instance, only composed of a single access point, this may happen quite frequently and will therefore cause heavy signaling traffic. Such heavy signaling traffic is one of the main obstacles to decentralize a hierarchical mobile communication system architecture.

One aspect from a network operator's point of view is a multi-vendor environment and not a supplier specific solution, resulting in a minimal impact on existing standards while avoiding interchangeability of network elements. Although different solutions involving a decentralized approach for the above mentioned problem have been suggested, but most of these approaches propose modifications in many existing standards or changes in a system implementation at a significant expense of cost and deployment effort.

The present invention is directed to overcoming, or at least reducing, the effects of, one or more of the problems set forth above.

SUMMARY OF THE INVENTION

In one embodiment of the present invention, a method is provided for managing mobility of a wireless communication device across a first and a second access node in a common administrational area of a network. The method comprises using the first access node to assign a temporary identification to the wireless communication device, causing the second access node to identify the first access node from which the temporary identification originates and hiding the mobility of the wireless communication device from the network when routing traffic to a serving access node of the first and second access nodes based on the identified first access node and the temporary identification.

In another embodiment, a method is provided for managing mobility of a plurality of wireless communication devices across a group of access nodes in a radio network. The method comprises replacing a physical central node, intended to act as a mobility anchor having substantially all functions within a mobile telecommunication system, with a logical centralized functionality and distributing the logical centralized functionality across at least two decentralized access nodes of the group of access nodes.

In yet another embodiment, an apparatus is provided for managing mobility of a wireless communication device across a first and a second access node in a common administrational area of a network. The apparatus comprises means for using the first access node to assign a temporary identification to the wireless communication device, means for causing the second access node to identify the first access node from which the temporary identification originates and means for hiding the mobility of the wireless communication device from the network when routing traffic to a serving access node of the first and second access nodes based on the identified first access node and the temporary identification.

In still another embodiment, an article comprising a computer readable storage medium storing instructions that, when executed cause a system to use the first access node to assign a temporary identification to the wireless communication device, cause the second access node to identify the first access node from which the temporary identification originates and hide the mobility of the wireless communication device from the network when routing traffic to a serving access node of the first and second access nodes based on the identified first access node and the temporary identification.

BRIEF DESCRIPTION OF THE DRAWINGS

The invention may be understood by reference to the following description taken in conjunction with the accompanying drawings, in which like reference numerals identify like elements, and in which.

Figure 1:
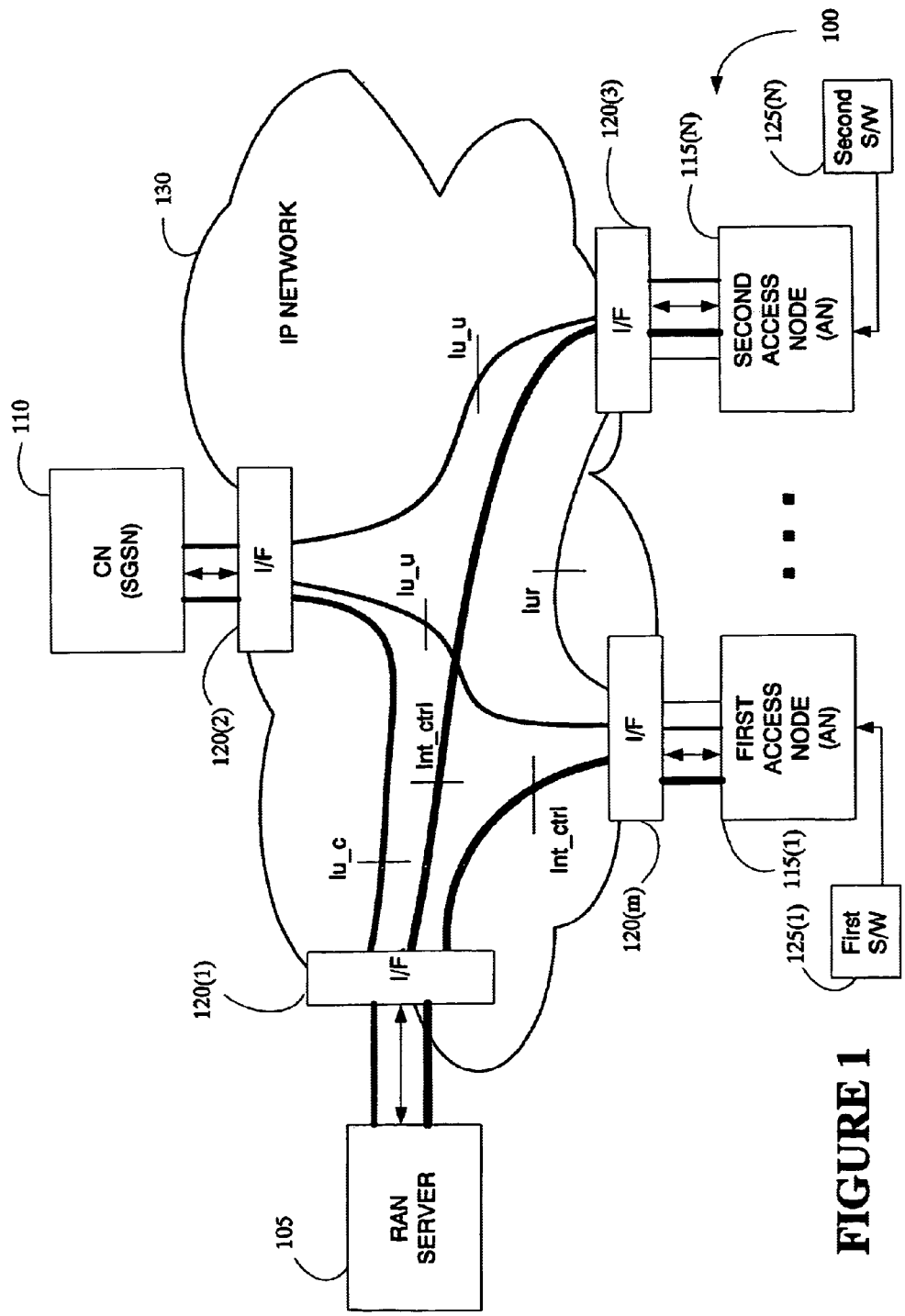
FIG. 1 illustrates a distributed radio access network for managing mobility of a wireless communication device across a first and a second access node in a common administrational area of the network according to one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Generally, a method and an apparatus is provided to manage mobility of a wireless communication device across a first and a second access nodes in a common administrational area of a network, such as for a digital cellular network in a telecommunication system. This method and apparatus addresses migration of one or more functions of radio specific processing from a central node to one or more decentralized radio access nodes without impacting a radio access network architecture and communication standards. In one embodiment, mobility of a plurality of wireless communication devices may be managed across a group of access nodes in a radio access network by replacing a physical central node, intended to act as a mobility anchor having substantially all functions within a mobile telecommunication system, with a logical centralized functionality. This logical centralized functionality may be distributed across at least two decentralized access nodes of a group of access nodes. Use of software at these access nodes may enable a multi-vendor environment and a non-supplier specific method and apparatus for mobility management of one or more wireless communication devices across a group of radio access nodes including base stations or Node Bs with insignificant impact on existing standards and interchangeability of network elements of a network. Advantageously, e.g., through such decentralization, network vendors may provide mobility management by deploying a centralized logical functionality instead of centralized physical nodes in an Internet protocol (IP) network.

However, for a successful migration from an Asynchronous Transfer Mode (ATM) to an Internet protocol (IP), it is advantageous to shift more and more functions of radio specific processing from a central node to decentralized radio access nodes. This migration, however, causes problems when it comes to managing mobility of multiple users within a given group of access nodes (e.g. micro-mobility within a location or a routing area). The ATM typically refers to a dedicated connection switching technology that organizes digital data into several byte cell units and transmits the same over a physical medium using digital signal communication based Universal Mobile Telecommunication System Terrestrial Radio Access Network (UTRAN). Likewise, the Internet protocol (IP) generally refers to a communications protocol underlying the Internet that allows large, geographically diverse networks of computers to communicate with each other over a variety of physical links using Internet protocol numerical address by which a location in the Internet is identified based radio access network architecture.

Referring to FIG. 1, a distributed network, such as a distributed radio access network (RAN) 100 includes a RAN server 105 coupled to a core network (CN) 110 and a first and a second access node (AN) 115(1-N) integrated through a plurality of interfaces (I/Fs) 120(1-m) for managing mobility of a wireless communication device without a conventional central node according to one embodiment of the present invention. The distributed RAN 100 may manage mobility of a wireless communication device, such as user equipment (UE) or mobile station (MS) across the first and second access nodes 115(1-N), such as base stations, for example, Node-Bs.

To this end, in one embodiment, the first access node 115(1) may comprise a first software (S/W) module 125(1) for the purposes of managing mobility of the wireless communication device in a network, such as an Internet-Protocol (IP) network 130. Likewise, the second access node 115(N) may include a second software (S/W) module 125(N). For example, the first and second S/W modules 125(1-N) may cooperatively control wireless communications over an air interface between a base station and a mobile phone across the first and second access nodes 115(1-N) via the Iur interface within a telecommunication system, such as a Universal Mobile Telecommunication System (UMTS) in accordance with one embodiment of the present invention. The air interface may define a frequency use (frequencies), a bandwidth of an individual radio channel (channels), encoding methods used, such as a wideband code division multiple access (W-CDMA), a time division (TD-CDMA), and cdma2000 and other parameters used by a radio frequency (RF) communication of voice and/or data over the IP network 130.

Specifically, the first and second S/W modules 125(1-N) may cooperatively provide an anchor for mobility management of the wireless communication device in an administrational area which may be common, same, or shared within the IP network 130 in the distributed RAN 100. While the anchor may provide a logically centralized node for the wireless communication device in the IP network 130, the administrational area may be an area that is common between each of the two decentralized access nodes, i.e., the first and second access nodes 115(1-N).

The distributed RAN 100 may enable a separate processing of a control plane (c) and a user-plane (u) and allow relocation of a segmentation process and a re-assembly process into an access node, for example, the first access node 115(1), such as a Node B. The RAN server 105 may handle central functions of a RNC, whereas the access node, for example, the first access node 115(1), such as a Node B may perform cell-related functions. The user traffic may be directly routed from the core network (CN) 110 to a respective Node B, essentially bypassing the RNC/RAN Server. The Iu interface to the core network 110 may be split into at least two flows, of which one is directed to the RAN Server 105, carrying control traffic (Iu_c) and the other flow may carry user traffic that may be directly routed to the destination Node B (Iu_u).

The RAN server 105 may control a UMTS terrestrial radio access network (UTRAN), and manage the provisioning of the Iu-bearers including the Iu_c for the control plane and Iu_u for the user plane. The RAN server 105 may also provide a distributed RAN control (DRC) bearer interface (int_ctrl) between the RAN server 105 and the first access node 115(1), such as a Node B. The bearer interface int_ctrl may functionally be an internal interface of a RNC whereas an external bearer interface Iub may reside inside that access node, i.e., the first access node 115(1).

The RAN server 105 may keep track of one or more users, e.g., in one embodiment, all users in the UTRAN and provide a micro-mobility management. Control information between the RAN Server 105 and the first access node 115(1) may be transferred via an int_ctrl interface. Each Node B, i.e., the first and second access nodes 115(1-N) may provide an Iur interface for handover. In this way, the RAN server 105 may manage micro-mobility (i.e. mobility inside the UTRAN including paging and Node B relocation) via the int_ctrl interface, whereas radio-mobility (i.e. mobility between adjacent Node Bs as soft or softer handover) may be managed by the first access node 115(1), such as a Node B itself.

In operation, the first and second S/W modules 125(1-N) may cooperatively manage mobility of the wireless communication device by using the first access node 115(1) to assign a temporary identification to the wireless communication device. The first and second S/W modules 125(1-N) may cause the second access node 115(N) to identify the first access node 115(1) from which the temporary identification originates. In this way, the distributed RAN 100 may hide the mobility of the wireless communication device from the IP network 130 when routing traffic to a serving access node out of the first and second access nodes 115(1-N) based on the identified first access node 115(1) and the temporary identification.

Using the temporary identification, the distributed RAN 100 may differentiate between a first and a second type of identification and an individual wireless communication device. For example, the first type of identification may be of a circuit switched origin and the second type of identification may be of a packet switched origin. The temporary identification may be used to differentiate between the first and second access nodes 115(1-N0 based on a local radio network controller (RNC) identification. Using of this temporary identification may avoid a frequent usage of an international mobile subscriber identity of the wireless communication device. By associating additional information with the temporary identification, e.g., under control of a radio access network (RAN) operator in the IP network 130, consistent with one embodiment, privacy of a user may be kept.

To route traffic to the serving access node, the first and second S/W modules 125(1-N) may identify the logically centralized node based on a temporary identity relevant within the common administrational area for a mobile subscriber. The temporary identity may be a temporary mobile subscriber identification (TMSI). However, the wireless communication device may first register at an access node, for example, at the first access node 115(1). This registration may provide specific information about the wireless communication device. Accordingly, in one embodiment, the distributed RAN 100 may cause the first access node 115(1), at which the wireless communication device registers first, to become the serving access node. In this manner, the traffic of one or more logically centralized nodes may be shared among one or more access nodes including the first and second access nodes 115(1-N) in the IP network 130.

Figure 2:
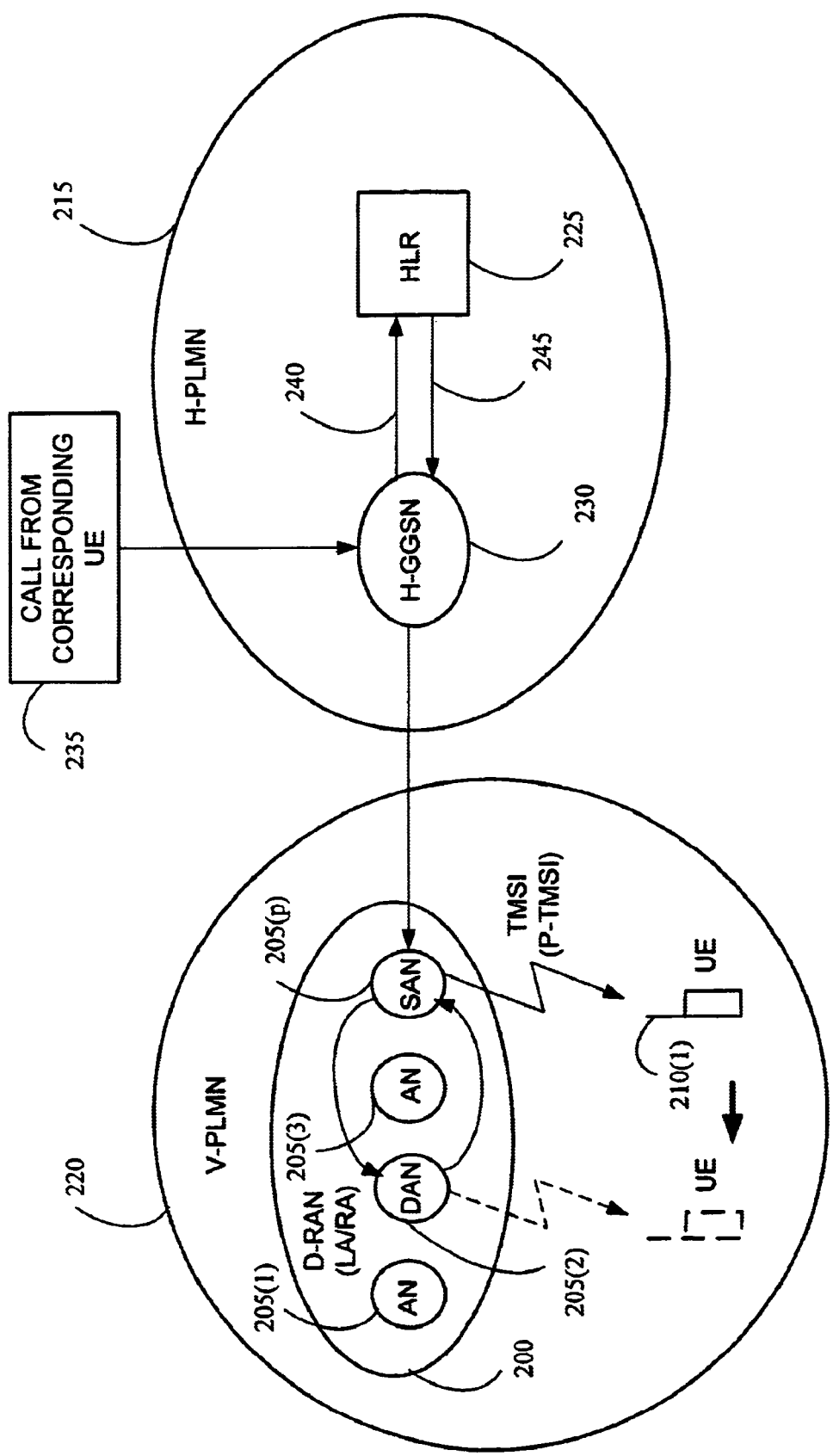
FIG. 2 illustrates a distributed radio access network architecture for the distributed radio access network shown in FIG. 1 including a multiplicity of integrated access nodes for addressing a wireless communication device, such as user equipment in accordance with one embodiment of the present invention.

Turning now to FIG. 2, a distributed radio access network architecture (D-RAN) 200 for the distributed RAN 100 shown in FIG. 1 includes a multiplicity of integrated access nodes (AN) 205(1-p) for addressing a wireless communication device, such as user equipment UE 210(1), within a telecommunication system, such as a Universal Mobile Telecommunication System (UMTS) in accordance with one embodiment of the present invention. The D-RAN 200 may use a home public land mobile network (PLMN) H-PLMN 215 in which an UE is subscribed and a visited PLMN (V-PLMN) 220 in which an UE currently resides. The H-PLMN 215 includes a home location register (HLR) 225 that may contain subscription information and an access point name (APN) of a current location, i.e., a network address of a destination in the V-PLMN 220. The H-PLMN 215 may further include a home gateway General Packet Radio Service (GPRS) support node (GGSN), H-GGSN 230, i.e., at which an UE is subscribed.

In operation, in response to a mobility indication of a first wireless communication device of a plurality of wireless communication devices, i.e., mobility of the user equipment, UE 210(1) between at least two decentralized access nodes, i.e., 115(1-N), this mobility indication may be reported to the HLR 225. The HLR 225 may contain subscription information and an associated access point name (APN) of a current location. Likewise, in response to the UE 210(1) registering at a mobile telecommunication system, at least one of an authentication, authorization, and accounting procedure (AAA) may be performed using a unique international mobile subscriber identity (IMSI) number of the UE 210(1). If or when at least one of these authentication, authorization, and accounting procedures completes successfully, a temporary identification may be assigned for a temporary mobile subscriber identity (TMSI) to the UE 210(1).

Using the temporary identification to identify a first decentralized node of two decentralized access nodes, i.e., 115(1-N) at which the UE 210(1) registers a first time by assigning a unique group of temporary identification to each access node of the group of access nodes. In response to the UE 210(1) registering at the first decentralized node, 115(1), the temporary identification out of the unique group of temporary identification of the first decentralized node may be assigned. The associated access point name of the first decentralized node 115(1) may be reported to the HLR 225 of the UE 210(1).

Consistent with one specific embodiment, each access node of the multiplicity of integrated access nodes 205(1-p) may substantially include all functions within a UMTS system because a logical centralized functionality may become a "mobility anchor," replacing a conventional physical central node such that mobility between the access nodes 205(1-p) may not be reported to the HLR 225. The H-GGSN 230 may receive a call 235 from a corresponding UE at the H-PLMN 215, according to one embodiment. The H-GGSN 230 may issue a request 240 on a current destination of the called UE. In response, the HLR 225 may provide a response 245 including the APN of the current destination of the called UE.

When an UE, such as the UE 210(1) registers at a UMTS system, the UE 210(1) may perform an authentication, authorization, and accounting procedure (AAA) using an associated unique international mobile subscriber identity (IMSI) number. Upon successfully completing this AAA procedure, the UE 210(1) may be assigned a temporary identification (ID), so-called a temporary mobile subscriber identity (TMSI), for example, in case of a circuit-switched (CS) domain or a packet TMSI (P-TMSI) in case of a packet-switched (PS) domain. As long as the UE 210(1) remains registered, in one embodiment, the UE 210(1) may retain this temporary ID. However, the UE 210(1) may be requested to re-register, for example, on a demand from a network operator.

The temporary ID may be used to identify a decentralized node, at which the UE has registered a first time. This decentralized node may perform the AAA procedure with the HLR 225 and may assign a unique group of temporary ID to each access node, e.g., the multiplicity of integrated access nodes 205(1-p). When the UE 210(1) registers at an access node of the multiplicity of integrated access nodes 205(1-p), the UE 210(1) gets assigned a first temporary ID out of the group of temporary ID of that access node and the access point name (APN) corresponding to the first temporary ID may be reported to the HLR 225 of the UE 210(1).

In this way, an in and/or outbound communication of the UE 210(1) may be routed via that access node, i.e., a serving access node (S-AN) 205(p). If the UE 210(1) moves in an active state to another access node, i.e., a drift access node (D-AN) 205(2), the S-AN 205(p) may automatically track the current location of the UE 210(1), i.e., D-AN 205(2), while serving as a router towards the D-AN 205(2). If the UE 210(1) has moved in an idle state to another AN, and a call (e.g., CS or PS) arrives at the S-AN 205(p), this node may page the UE 210(1) using the temporary ID thereof. That is, in one embodiment, the S-AN 205(p) may first page in its own area, and if unsuccessful, may then page in the areas of other access nodes, i.e., the multiplicity of integrated access nodes 205(1-p), e.g., all access nodes of a same administrational area.

The UE 210(1) may respond to a paging request form a serving access node, such as the S-AN 205(p) with a connection setup, followed by a reported service request at the access node in which area the UE 210(1) currently resides, i.e., the D-AN 205(2). By analyzing the paging request, the D-AN 205(2) may determine the serving access node, the temporary ID submitted by the UE 210(1) and the APN of the S-AN 205(p). The D-AN 205(2) may redirect some or all of the further communication to the serving access node, i.e., the S-AN 205(p). Optionally, depending upon a particular network operator, the D-AN 205(2) may itself now register at the HLR 225 of the UE 210(1) and assign a new temporary ID to the UE 210(1) to become a new S-AN for that UE, i.e., a S-AN relocation procedure may be triggered.

To establish a connection, the UE 210(1) after having moved in an idle state and to another access node (AN) contacts the access node (AN) in which's area it currently resides and submits a service request. From the temporary ID of the UE 210(1), the AN determines that the UE 210(1) is attached to the IP network 130 and at which service access node the UE 210(1) is registered. The AN may re-route signaling and user traffic to the serving access node, such as the S-AN 205(p). Again, a S-AN relocation procedure may be performed in response to a demand from a specific network operator.

In an implementation of a UMTS terrestrial radio access network (UTRAN), a temporary ID may be used to avoid a frequent usage of the IMSI and to keep privacy of a user. A temporary ID may be devised to only have a local relevance and may be under control of a network operator, the temporary ID may contain additional information. In one embodiment of the present invention, the temporary ID may not only be used to differentiate between different types of IDs (e.g., temporary IDs of CS and PS origin) and an individual UE, but may also be used to differentiate between network nodes (e.g., by a local radio network controller (RNC)-ID). In this case, an access node, which originated the temporary ID, may be unambiguously identified by any other access node in a common or same administrational area since the temporary ID may contain relevant information of a specific UE. This information may be used to route the traffic to a current access node, e.g., the D-AN 205(2) and to hide the mobility of the UE 210(1) from a backbone network.

With this usage of the temporary ID, as set forth above, a micro-mobility of the UE 210(1) may be managed in a de-centralized UTRAN. The access node (AN), which has assigned the temporary ID to an UE, such as the UE 210(1) may be unambiguously identified by any other access node in a common or same administrational area of the de-centralized UTRAN. As the temporary ID may only be rendered relevant within one administrational area (e.g. LA, RA), the D-RAN 200 may not unduly influence already installed network components of the IP network 130 in the de-centralized UTRAN. A logically centralized node may be made available for every UE in the IP network 130. This logically centralized node may be unambiguously identified by the TMSI or P-TMSI without a central physical node. The traffic of one or more centralized logical nodes may be shared among the multiplicity of integrated access nodes 205(1-p) in the IP network 130, as the access node where the UE 210(1) registers first, becomes the S-AN 205(p).

Figure 3:
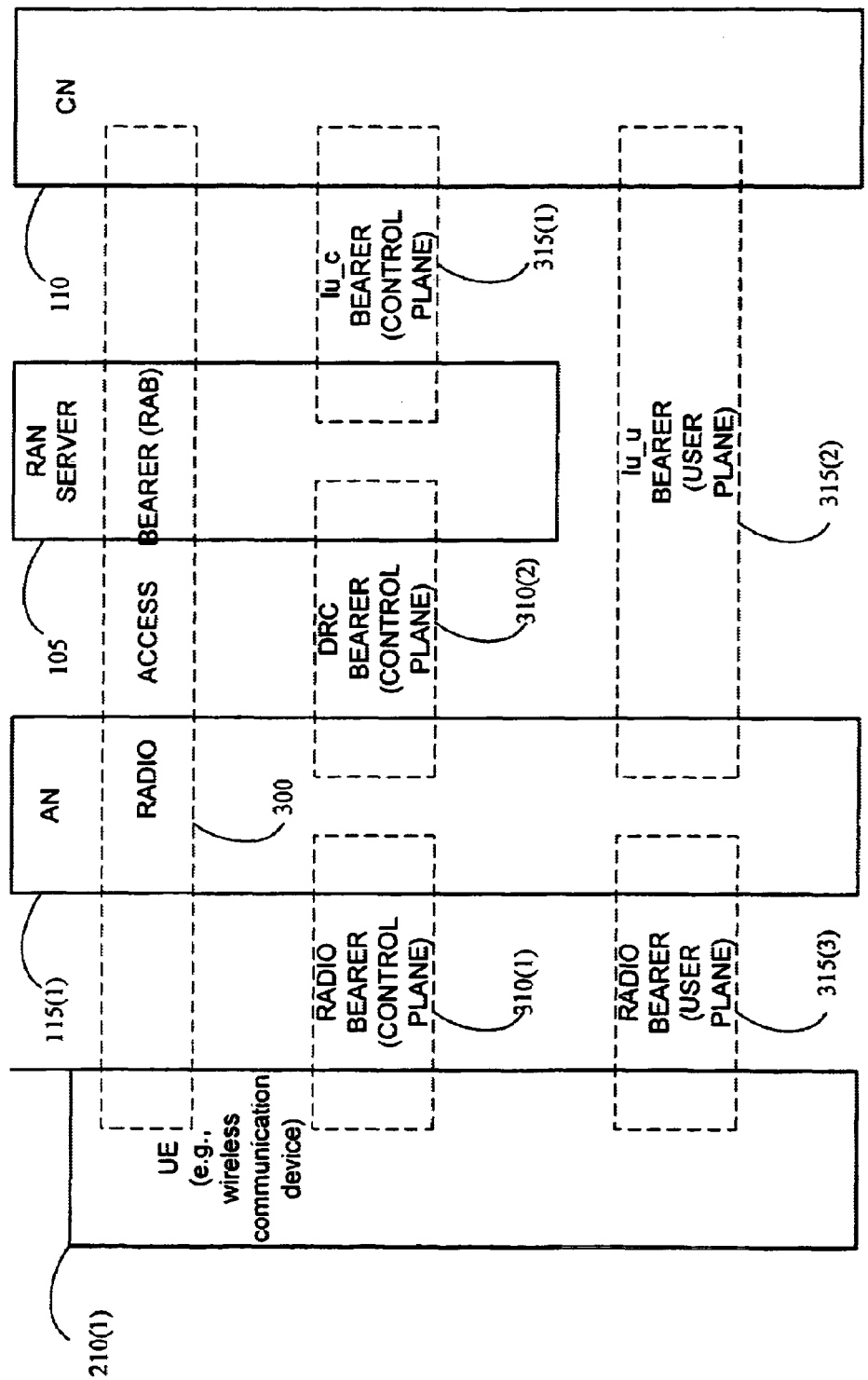
FIG. 3 illustrates bearer services in the distributed radio access network shown in FIG. 1 consistent with one embodiment of the present invention.

Referring to FIG. 3, using the D-RAN 200 shown in FIG. 2, one or more bearer services 310(1-3) may be provided in the distributed RAN 100 shown in FIG. 1 consistent with one embodiment of the present invention. A bearer service may include a set of services offered over a channel (bearer channel) that allows exchange of signals between at least two user-network interfaces. That is, the bearer service may provide an underlying network capacity for transmission to occur between the UE 210(1) and the multiplicity of integrated access nodes 205(1-p) in the IP network 130.

In the distributed RAN 100 shown in FIG. 1, a control logic of a UTRAN may be distributed in the first and second S/W modules 125(1-N) across the two decentralized access nodes, i.e., the first and second access nodes 115(1-N). Referring back to FIG. 3, the first and second S/W modules 125(1-N) may manage provisioning of the bearer services 310(1-3) for control and user traffic to establish a radio access bearer (RAB) 300 between a wireless communication device, such as the UE 210(1) and the core network 110. At some point, a radio frequency (RF) communication and one or more Iu bearers 315(1-2) may be established based on different conventional network and communication protocols using a radio network controller.

Figure 4:
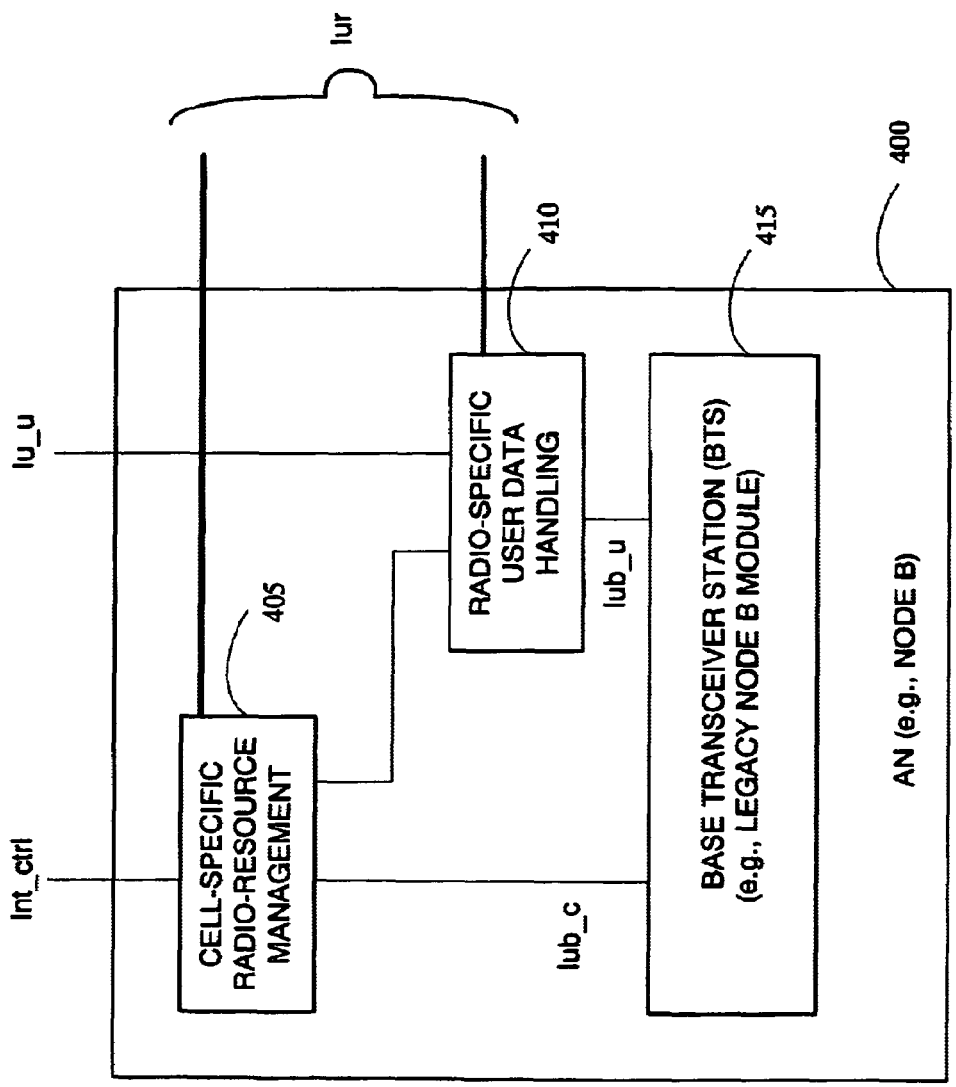
FIG. 4 depicts an access node, such as an intelligent base station, for example, Node-B, in the distributed radio access network shown in FIG. 1 according to one illustrative embodiment of the present invention.

Referring to FIG. 4, an access node or an intelligent base station, for example, a Node B 400 is depicted in the distributed RAN 100 shown in FIG. 1 according to one illustrative embodiment of the present invention. The Node B 400 may comprise a cell specific radio processing module 405 for cell-related radio resource management and a radio specific user data handling module 410. The Node B 400 may also include a legacy Node B module 415 which may be extended by a distributed function of user plane processing from RNC processing.

In operation, the cell specific radio resource management may enable the Node B 400 to manage its radio resources autonomously. On demand, for example, the radio resources may be requested from the RAN server 105 via the int_ctrl interface. Soft-handover may be managed between adjacent Node Bs via the Iur interface. The radio specific user data handling module 410 may process data, such as medium access control (MAC) layer data and packet data convergence protocol (PDCP) data of a UMTS system in conjunction with separation of the control and user planes, providing a service differentiation down to a radio access node.

Figure 5:
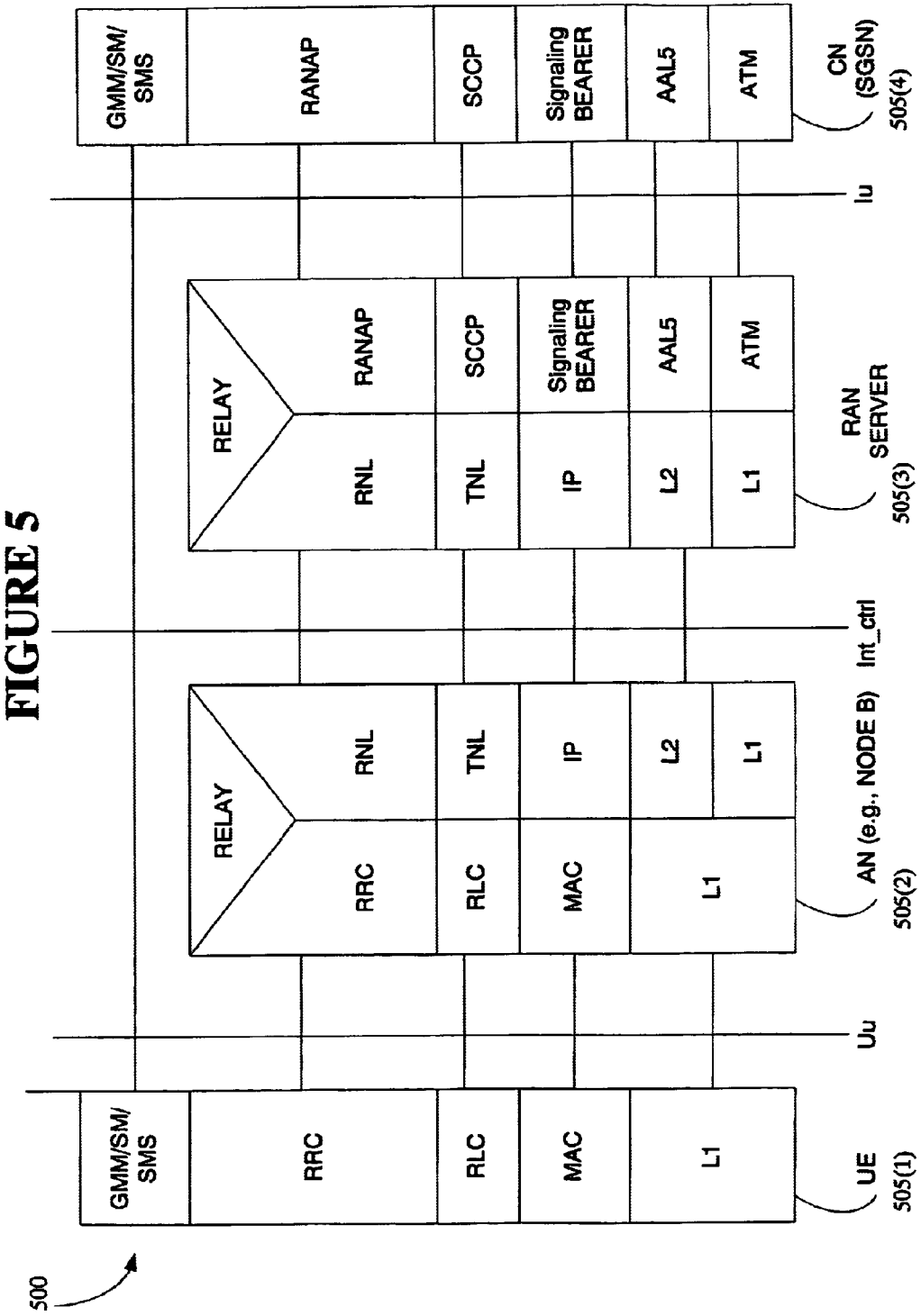
FIG. 5 illustrates a control plane in the distributed radio access network shown in FIG. 1 with functional split between a radio access server and the intelligent base station shown in FIG. 4 in accordance with an exemplary embodiment of the present invention.

As shown in FIG. 5, a protocol stack 500, such as that of a control plane for the UTRAN in the distributed RAN 100 shown in FIG. 1 may be functionally split between the RAN server 105 and the Node B 400 shown in FIG. 4 in accordance with an exemplary embodiment of the present invention. More specifically, the protocol stack 500 may comprise a first stack 505(1) at the UE 210(1) and a second stack 505(2) may reside at the access node, e.g., the first access node 115(1), i.e., the Node B 500. A third and a fourth stack 505(3-4) may reside at the RAN server 105 and the CN 110, respectively.

In particular, consistent with one embodiment, the first stack 505(1) may include a physical layer L1, followed by a medium access control (MAC) layer, over which there may be a radio link control (RLC) layer, in turn, supporting a Radio Resource Control (RRC) layer that handles the control plane signaling between the UE 210(1) and UTRAN and on the top is a signaling layer called GPRS mobility management (GMM)/Session Management (SM)/Short Message Service (SMS) (GMM/SM/SMS). The second stack 505(2) may include a first physical layer L1, followed by a medium access control (MAC) layer. On the MAC layer, a radio link control (RLC) layer may reside and a RRC layer may be provided over this layer. Upon the first physical layer L1, a second physical layer L2 may be provisioned besides the first physical layer L1 itself. An Internet Protocol (IP) layer may be rendered upon the second physical layer L2. Above the IP layer, a Transport Network Layer (TNL) layer may be provided. A Radio Network Layer (RNL) may sit over the TNL layer. As a top layer at the Node B 500, a relay layer may be shared over the RRC layer and the RNL layer.

A third stack 505(3) at the RAN server 105 may include a first physical layer L1, followed by a second physical layer L2. On the second physical layer L2, an Internet Protocol (IP) layer may reside. A Transport Network Layer (TNL) layer may be provided on the IP layer and above that A Radio Network Layer (RNL) may reside. In the RAN server 105, at the level of the first physical layer L1, an Asynchronous Transfer Mode (ATM) layer may exist side-by-side as well. An ATM Adaptation Layer 5 (AAL5) may be provided over the ATM layer upon which a signaling bearer layer may rest. Over the signaling bearer layer, a Signaling Connection Control Part (SCCP) layer may be implemented and on this layer a RANAP layer may be formed. As shown in FIG. 5, a common relay layer may reside on the RNL and RANAP layers at the RAN server 105.

A fourth stack 505(4) at a core network (CN)-Service GPRS Support Node (SGSN) may include a first layer as an ATM layer with a AAL5 layer sitting on top thereof. A signaling bearer layer may rest upon the ALL5 layer, and in turn, a SCCP layer may be used on this signaling layer. Between a GMM/SM/SMS layer on the top of the fourth stack 505(4) and the SCCP layer, a RANAP layer may exist, in some embodiments of the present invention.

Using the protocol stack 500, the D-RAN 200 shown in FIG. 2 for a UTRAN separates a RNC into a controlling node, i.e., the RAN server 105 and an extended radio access node, the intelligent base station or the Node B 400 shown in FIG. 4. This separation of the control and user planes may enable an individual scalability and may further provide a basis for an IP based radio access network with a capability of service differentiation for mobile multi media services.

Specifically, the protocol stack 500 of the D-RAN 200 enables a functional split between cell related and RAN specific functions. In one embodiment, since both of these functions may be located in a different network element, the int_ctrl interface may be used there between. In general, this int_ctrl interface may enable integration of a host of radio access technologies and services. To handle a set of services, e.g., offered in the UMTS, a subset of conventional protocols (such as a radio access network application part (RANAP) and a radio network sub system application part (RNSAP) may be used.

While, in the protocol stack 500, the cell related protocol handling may be performed at the Node B 400, the RAN specific protocol handling functionality may reside in the RAN server 105. For example, RANAP is terminated and processed in the RAN server 105. Likewise, one or more radio resource control (RRC) processes, as initiated by RANAP, may be executed in the specific Node B via the Iui interface. Internet Protocol (IP) may be used to address this Node B and other transport and radio network layers may be used conventionally.

Figure 6:
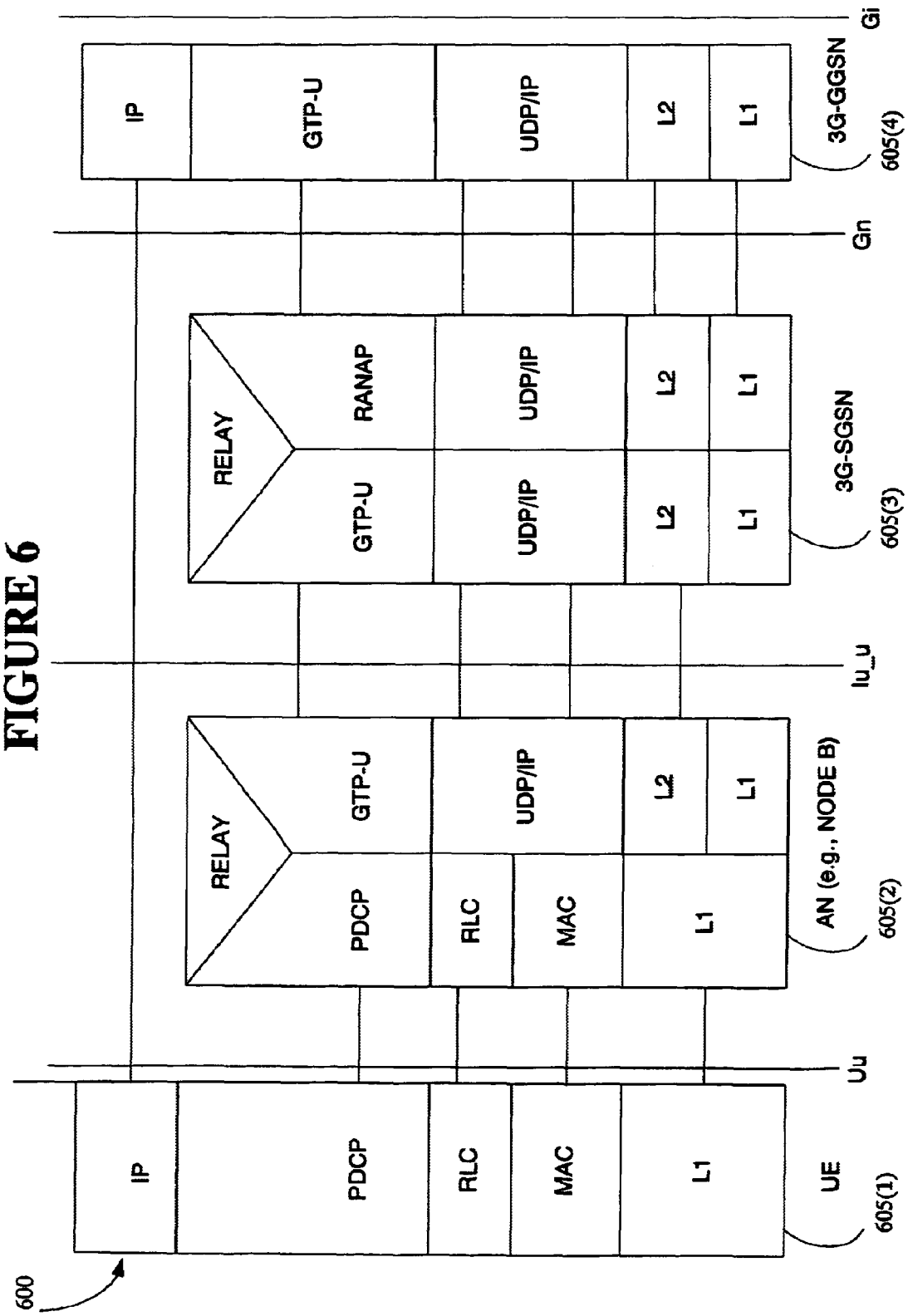
FIG. 6 illustrates a user plane in the distributed radio access network shown in FIG. 1 consistent with an embodiment of the present invention.

Turning now to FIG. 6, a protocol stack 600 of a user plane (u) is shown in the distributed RAN 100, as indicated in FIG. 1, consistent with an embodiment of the present invention. The user plane (u) 600 may be based on a protocol stack of a user plane of the UTRAN, Release 5, as described in 3GPP TS 23.060 General Packet Radio Service (GPRS) available from Third Generation Project Partnership (3GPP) of ETSI, Mobile Competence Centre; 650, route des Lucioles; 06921 Sophia-Antipolis Cedex, France. The distributed RAN 100 may use a centralized node in the control plane (c) and decentralize user plane handling to the first access node 115(1), i.e., the Node B 500. The transport between the CN (SGSN) 110 and the first access node 115(1) may use an IP routed network, providing a desired quality of service (QoS) for a service.

More specifically, according to one embodiment, the protocol stack 600 may comprise a first stack 605(1) at the UE 210(1) and a second stack 605(2) may reside at the access node, e.g., the first access node 115(1), i.e., the Node B 500. A third and a fourth stack 605(3-4) may reside at a 3G network-Service GPRS Support Node (3G-SGGN) and a 3G network-Gateway GPRS Support Node (3G-GGSN), respectively. The first stack 605(1) may include a physical layer L1, followed by a medium access control (MAC) layer, over which there may be a radio link control (RLC) layer, in turn, supporting a Packet Data Convergence Protocol (PDCP) layer and on the top thereof may be an IP layer. At the top of the first stack 605(1), an application layer may reside.

The second stack 605(2) may include a first physical layer L1, followed by a medium access control (MAC) layer and a second physical layer L2. On the MAC layer, a radio link control (RLC) layer may reside and a PDCP layer may further be provided over this layer. Another parallel stack may be incorporated in the second stack 605(2), starting with a L1 layer and a L2 layer being stacked thereupon. A User Datagram Protocol/Internet Protocol (UDP/IP) layer may be rendered upon the second physical layer L2. Above the UDP/IP layer, a layer referred to as GPRS Tunneling Protocol (GTP) for user plane data transfer (GTP-U) may be provided. At the Node B 500, a top layer may be a relay layer which is shared by the PDCP and GTP-U layers.

A third stack 605(3) at the 3G-SGSN may include two vertical stacks each with a layer L2 on a layer L1. A UDP/IP layer may be provided upon the second physical layer L2 in each of these two vertical stacks. Above the UDP/IP layer, a GTP-U layer may be provided at the 3G-SGGN. On the top, the two parallel GTP-U layers may share a relay layer. A fourth stack 605(4) at a 3G network-Gateway GPRS Support Node (3G-GGSN) may include a layer L2 on a layer L1. A UDP/IP layer may reside over the second physical layer L2 upon which a GTP-U layer may be placed. An IP layer may sit at the top of the fourth stack 605(4) at the 3G-GGSN, in one embodiment.

Figure 7:
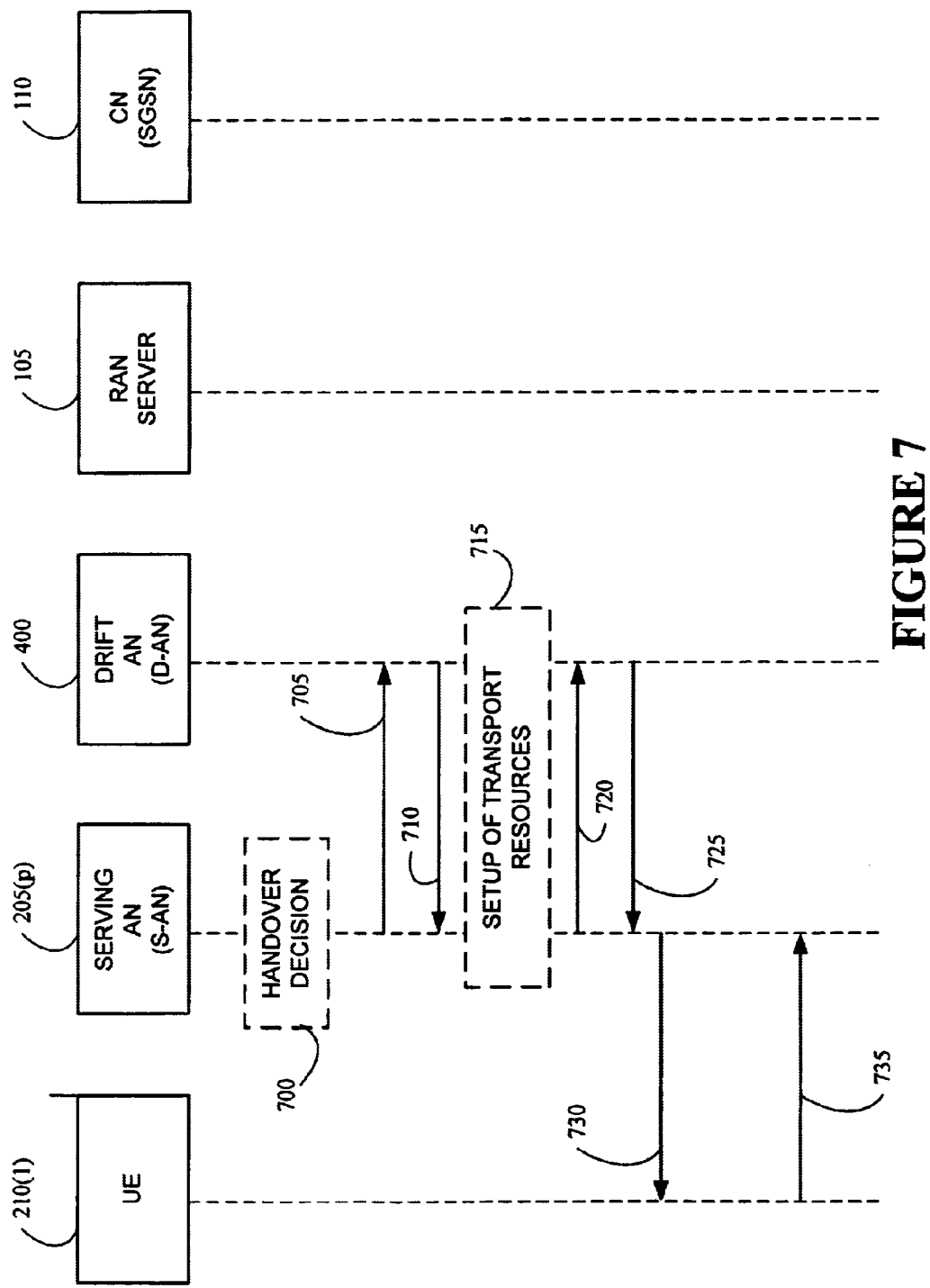
FIG. 7 illustrates a soft handover in the distributed radio access network shown in FIG. 1 according to an embodiment of the present invention.

With regard to FIG. 7, a soft handover using the protocol stacks 500, 600 is illustrated in the distributed RAN 100 shown in FIG. 1 according to an embodiment of the present invention. The soft handover involves passing of a call signal from one base station to a next base station as a user moves out of range, re-routing the call. For example, the soft handover may occur when a mobile user, for example, while using a cell phone, moves out of a range of one cell to connect to a next available cell, causing a preceding cell to handover a connection to a stronger cell. In one embodiment, a soft handover may be used when cells operated on a same frequency are changed. Using the soft handover, one or more radio links may be added and/or removed in a way that the UE 210(1) maintains at least one radio link to the UTRAN. The soft handover may be performed based on a macro diversity, which refers to a condition, that several radio links are active at a same time.

In the distributed RAN 100, a soft handover may be autonomously performed by the Node B 500 using one or more conventional or standardized protocols without an interaction with the RAN server 105. Within the D-RAN 200, as shown in FIG. 2, a soft handover may be handled using an internal interface, such as the Iub, at the Node B 500. As radio resources may be autonomously managed by the Node B 500, a soft handover may involve use of the Iur interface between the serving access node (S-AN) 205(p) and the drift access node (D-AN) 205(2). As each Node B may be logically connected with its neighbors via the Iur interface, the RAN server 105 may not be involved.

In operation, to obtain and/or carry out a handover decision 700, the S-AN 205(p) may issue a radio link setup request 705 to the D-AN 205(2). In response to this request, the D-AN 205(2) may provide a radio link setup response 710 to the S-AN 205(p). The S-AN 205(p) and the D-AN 205(2) may cooperatively setup transport resources, as shown in block 715. The S-AN 205(p) may indicate a downlink synchronization 720 to the D-AN 205(2). As a result, an uplink synchronization 725 may be provided by the D-AN 205(2). The S-AN 205(p) may send an active set update 730, such as an update for active cells, to the UE 210(1). Upon completion, as an acknowledgement, the UE 210(1) may issue an active set update complete indication 735 to the S-AN 205(p). In this manner, based on the D-RAN 200, mobility of a wireless communication device, e.g., the UE 210(1) may be managed for the distributed RAN 100 across a first and a second access node, i.e., the S-AN 205(p) and D-AN 205(2) in a common administrational area of the IP network 130 according to one embodiment of the present invention.

Figure 8:
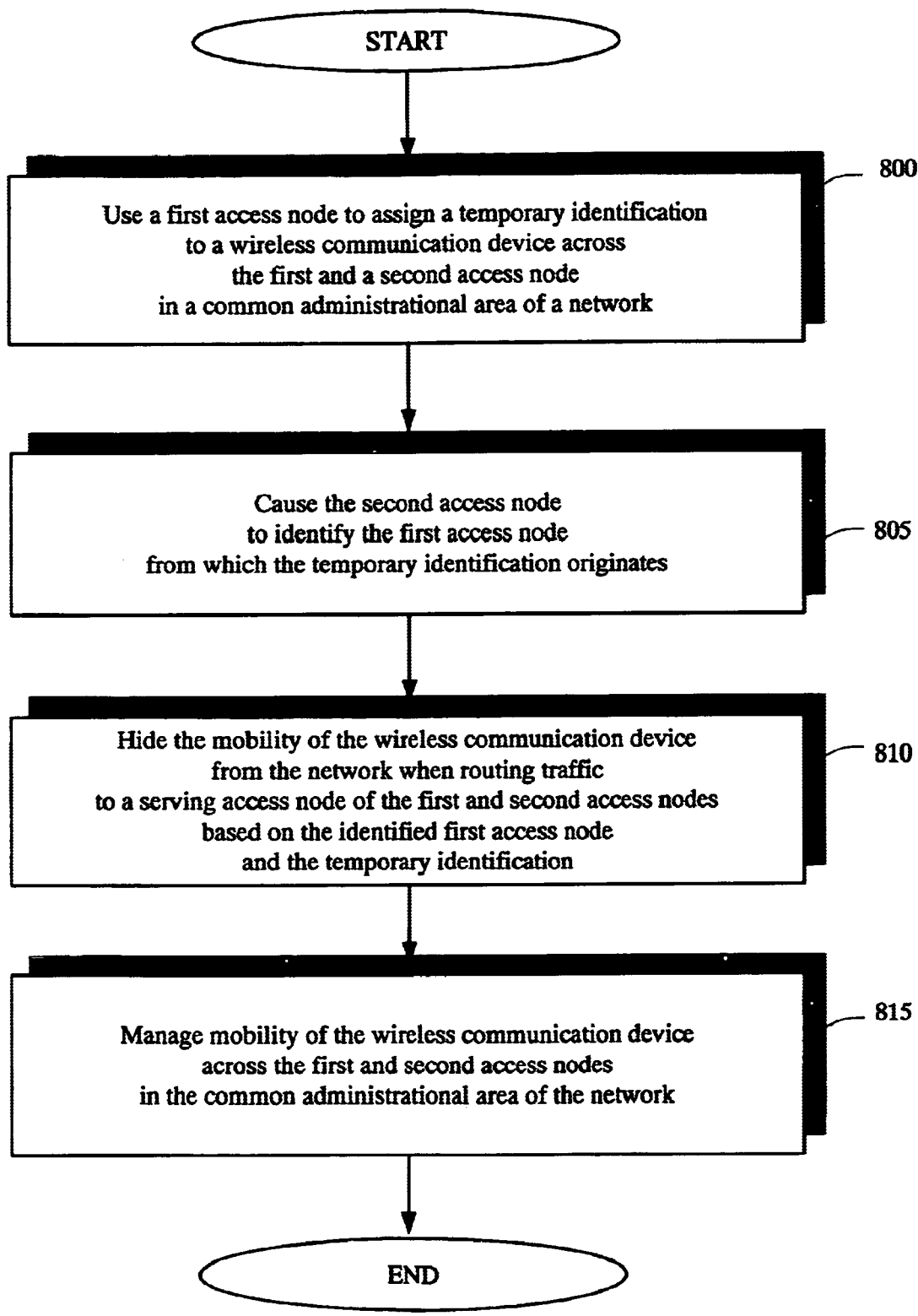
FIG. 8 illustrates a stylized representation of a flow chart implementing a method for managing mobility of a wireless communication device across the first and second access nodes shown in FIG. 1 in a common administrational area of the distributed radio access network in accordance with one embodiment of the present invention.

Referring to FIG. 8, a stylized representation of a flow chart implementing a method is provided for managing mobility of a wireless communication device e.g., the UE 210(1) across the first and second access nodes 115(1-N), i.e., the S-AN 205(p) and D-AN 205(2) shown in FIG. 2 in a common administrational area of the distributed RAN 100 in accordance with one embodiment of the present invention. At block 800, using the first and second S/W modules 125(1-N), the first access node 115(1) may assign a temporary identification to the wireless communication device e.g., the UE 210(1).

The first and second S/W modules 125(1-N) may cause the second access node, 115(N) to identify the first access node 115(1) from which the temporary identification originates, as indicated in block 805. As shown at block 810, the mobility of the UE 210(1) may be hidden from the IP network 130 when routing traffic to a serving access node, i.e., the S-AN 205(p) of the first and second access nodes 115(1-N) based on the identified first access node 115(1) and the temporary identification. In this way, mobility of a wireless communication device, i.e., the UE 210(1) may be managed across the first and second access nodes 115(1-N) in a common administrational area of the IP network 130.

Figure 9:
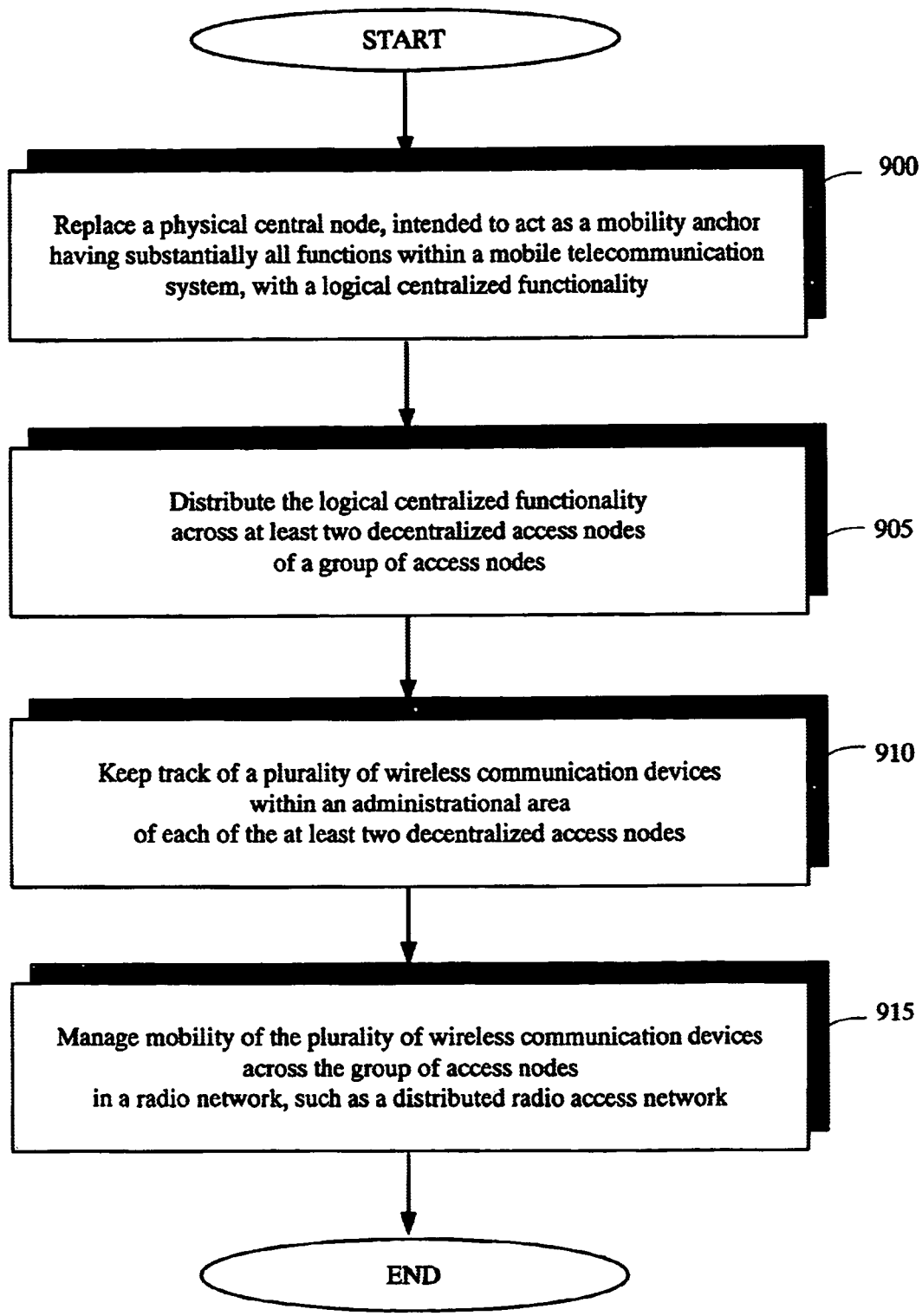
FIG. 9 illustrates a stylized representation of a flow chart implementing a method for using a mobility anchor for mobility management of the wireless communication device shown in FIG. 2 across the distributed radio access network shown in FIG. 1 without a conventional central node according to one embodiment of the present invention.

Finally, turning to FIG. 9, a stylized representation of a flow chart implementing a method is illustrated for using a mobility anchor for mobility management of the UE 210(1) shown in FIG. 2 across the distributed RAN 100 shown in FIG. 1 without a conventional central node according to one embodiment of the present invention. At block 900, a physical central node, intended to act as a mobility anchor having substantially all functions within a mobile telecommunication system, may be replaced with a logical centralized functionality. At block 905, the logical centralized functionality may be distributed across at least two decentralized access nodes, such as the ANs 115(1-N) of the group of access nodes. Within an administrational area common to each of these at least two decentralized access nodes; one or more wireless communication devices may be tracked, as shown in block 910. Therefore, at block 915, using the D-RAN 200 within the distributed RAN 100, mobility of a plurality of wireless communication devices may be managed across a group of access nodes in a radio network, such as the IP network 130 or the UTRAN.

Through a serving access node of the group of access nodes, such as the S-AN 205(p), in one embodiment, an inbound and an outbound communications of a wireless communication device, i.e., the UE 210(1) may be routed. If this wireless communication device, i.e., the UE 210(1) moves in an active state to another access node, such movement may be automatically tracked. This another access node may become a new serving access node at a current location and be informed of any movement of the wireless communication device, i.e., the UE 210(1) by an old serving access node. The old serving access node may serve as a router towards the new serving access node.

However, if the wireless communication device moves in an idle state to another access node and a call arrives at the serving access node, i.e., the S-AN 205(p), the first and second S/W modules 125(1-N) may cause this another access node to page the wireless communication device, e.g., the UE 210(1) with a new temporary identification, first in an area covered by the another access node. If unsuccessful, this another access node, i.e., the new serving access node may page the group of access nodes of the common administrational area. In response to paging from this another access node, the first and second S/W modules 125(1-N) may cause the wireless communication device to provide a connection setup, followed by a service request at the another access node having an area covered thereby in which the wireless communication device currently resides.

Specifically, the first and second S/W modules 125(1-N) may further cause the new serving access node to submit a paging request and cause the wireless communication device to submit a new temporary identification. Based on the paging request submitted by the new serving access node and the new temporary identification submitted by the first wireless communication device, this another access node may determine a new associated access point name of the new serving access node. Any further communication may be redirected to the new serving access node. A serving access node relocation procedure may be triggered, causing the another access node to register itself at the HLR 225 of the wireless communication device. In one embodiment, for example, the serving access node relocation procedure may be performed on demand of a network operator. The new temporary identification may be assigned to the wireless communication device so that this another access node becomes the new serving access node for the wireless communication device.

If and/or when, the wireless communication device after having moved in an idle state and to the another access node establishes a connection, the first and second S/W modules 125(1-N) may cause the wireless communication device to contact the new serving access node in the area where the wireless communication device currently resides and to submit the service request. Based on the temporary identification of the wireless communication device, the another access node may determine that the wireless communication device is attached to the radio network and the new serving access node at which the wireless communication device is registered. In this way, this another access node may re-route signaling and user traffic to the new serving access node.

Advantageously, to provide mobility management, network vendors may deploy a centralized logical functionality without introducing centralized physical nodes to the IP network 130. Since the P-TMSI and TMSI may be explicitly assigned by the IP network 130, in de-centralized networks mobility management may occur without affecting the standards and without introducing legacy issues. For IP-based networks, such as the IP network 130, the distributed RAN 100 based on the DRAN 200 may alleviate mobility problems introduced through decentralization. Use of the first and/or second S/W modules 125(1-N) may enable a multi-vendor environment and a non-supplier specific method and apparatus for mobility management of one or more wireless communication devices across radio access nodes including base stations or Node Bs with insignificant impact on existing standards and interchangeability of network elements of a network.

While the invention has been illustrated herein as being useful in a telecommunications network environment, it also has application in other connected environments. For example, two or more of the devices described above may be coupled together via device-to-device connections, such as by hard cabling, radio frequency signals (e.g., 802.11(a), 802.11(b), 802.11(g), Bluetooth, or the like), infrared coupling, telephone lines and modems, or the like. The present invention may have application in any environment where two or more users are interconnected and capable of communicating with one another.

Those skilled in the art will appreciate that the various system layers, routines, or modules illustrated in the various embodiments herein may be executable control units. The control units may include a microprocessor, a microcontroller, a digital signal processor, a processor card (including one or more microprocessors or controllers), or other control or computing devices as well as executable instructions contained within one or more storage devices. The storage devices may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions, when executed by a respective control unit, causes the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A method for managing mobility of a wireless communication device across a first and a second access node in a common administrational area of a network, the method comprising:

using said first access node to assign a temporary identification to said wireless communication device, wherein said temporary identification contains information that identifies the wireless communication device to the first and second access nodes and identifies the first access node as a serving access node for the wireless communication device;

using the temporary identification to differentiate between a first and a second type of identification and an individual wireless communication device, wherein said first type of identification is of a circuit switched origin and said second type of identification is of a packet switched origin;

causing said second access node to identify said first access node from which the temporary identification originates based on the temporary identification; and hiding the mobility of said wireless communication device from the network by routing traffic to said first access node based on the temporary identification.

2. A method, as set forth in claim 1, wherein routing traffic to a sewing access node further comprising:

providing a logically centralized node for said wireless communication device in the network; and identifying the logically centralized node based on a temporary identity relevant within the common administrational area for a mobile subscriber.

3. A method, as set forth in claim 2, further comprising:

causing said first access node at which said wireless communication device registers first to become said serving access node as said first access node contains specific information about said wireless communication device; and sharing the traffic of one or more logically centralized nodes among one or more access nodes including said first and second access nodes in the network.

4. A method, as set forth in claim 1, further comprising:

using the temporary identification to differentiate between said first and second access nodes based on a local radio network controller identification.

5. A method, as set forth in claim 1, further comprising:

using the temporary identification to avoid a frequent usage of an international mobile subscriber identity of said wireless communication device.

6. A method, as set forth in claim 5, further comprising:

associating additional information with the temporary identification under control of a radio access network operator in the network; and using additional information with the temporary identification to keep privacy of a user.

7. An apparatus for managing mobility of a wireless communication device across a first and a second access node in a common administrational area of a network, the apparatus comprising:

means for using said first access node to assign a temporary identification to said wireless communication device, wherein said temporary identification contains information that identifies the wireless communication device to the first and second access nodes and identifies the first access node as a serving access node for the wireless communication device;

means for using the temporary identification to differentiate between a first and a second type of identification and an individual wireless communication device, wherein said first type of identification is of a circuit switched origin and said second type of identification is of a packet switched origin;

means for causing said second access node to identify said first access node from which the temporary identification originates based on the temporary identification; and means for hiding the mobility of said wireless communication device from the network by routing traffic to said first access node based on the temporary identification.

8. An apparatus, as set forth in claim 7, wherein the network is defined at least in part based on a Universal Mobile Telecommunication System Terrestrial Radio Access Network.

9. An article comprising a computer readable storage medium storing instructions that, when executed cause a system to:

use a first access node to assign a temporary identification to said wireless communication device, wherein said temporary identity contains information that identifies the wireless communication device to the logically centralized node and identifies a first access node as a serving access node for the wireless communication device;

use the temporary identification to differentiate between a first and a second type of identification and an individual wireless communication device, wherein said first type of identification is of a circuit switched origin and said second type of identification is of a packet switched origin;

cause a second access node to identify said first access node from which the temporary identification originates based on the temporary identification; and hide the mobility of said wireless communication device from the network by routing traffic to said first access node based on the temporary identification.

10. An article, as set forth in claim 9, comprising a medium storing instructions that, when executed cause a system to:

provide a logically centralized node for said wireless communication device in the network;

identify the logically centralized node based on a temporary identity relevant within the common administrational area for a mobile subscriber;

cause said first access node at which said wireless communication device registers first to become said serving access node as said first access node contains specific information about said wireless communication device; and share the traffic of one or more logically centralized nodes among one or more access nodes including said first and second access nodes in the network.

* * * * *